(12) United States Patent
Scheinert et al.

(10) Patent No.: US 7,457,633 B2
(45) Date of Patent: Nov. 25, 2008

(54) COMMUNICATION NETWORK WITH REDIRECTION OF WIRELESS COMMUNICATION

(75) Inventors: Stefan Scheinert, San Diego, CA (US); Joeeun Yi, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 325 days.

(21) Appl. No.: 10/264,463

(22) Filed: Oct. 3, 2002

(65) Prior Publication Data

US 2003/0134630 A1 Jul. 17, 2003

Related U.S. Application Data

(60) Provisional application No. 60/327,098, filed on Oct. 3, 2001.

(51) Int. Cl.
H04M 1/00 (2006.01)
(52) U.S. Cl. .................. 455/550.1; 455/552.1; 455/418; 379/212.01; 370/328
(58) Field of Classification Search .................. 455/445, 455/461, 426.1, 426.2, 458, 422.1, 552.1, 455/404.1, 417, 554.2, 508, 418, 550.1; 379/211.02, 379/212.01, 221.01; 370/329, 349
See application file for complete search history.

(56) References Cited

U.S. PATENT DOCUMENTS

| | | | |
|---|---|---|---|
| 5,479,479 A * | 12/1995 | Braitberg et al. .......... 455/404.1 |
| 5,745,850 A * | 4/1998 | Aldermeshian et al. ..... 455/417 |
| 5,787,344 A | 7/1998 | Scheinert |
| 5,910,946 A | 6/1999 | Csapo |
| 6,128,496 A | 10/2000 | Scheinert |
| 6,223,055 B1 * | 4/2001 | Cyr ........................... 455/555 |
| 6,411,802 B1 * | 6/2002 | Cardina et al. ............. 455/424 |
| RE37,820 E | 8/2002 | Scheinert |
| 6,459,900 B1 | 10/2002 | Scheinert |
| 6,484,036 B1 * | 11/2002 | Sorkin et al. ................ 455/508 |
| 6,526,277 B1 * | 2/2003 | Zicker et al. ............ 455/426.2 |
| 6,603,975 B1 | 8/2003 | Inouchi et al. |
| 6,725,045 B2 * | 4/2004 | Oren et al. .................. 455/445 |
| 6,781,972 B1 * | 8/2004 | Anderlind et al. ........... 370/329 |
| 6,785,560 B1 * | 8/2004 | Chow et al. ................. 455/564 |
| 2002/0004403 A1 * | 1/2002 | Yariv et al. ................. 455/461 |
| 2002/0075846 A1 | 6/2002 | Valentine et al. |
| 2002/0089951 A1 | 7/2002 | Hyun et al. |
| 2002/0131387 A1 | 9/2002 | Pitcher et al. |
| 2003/0045306 A1 * | 3/2003 | Himmel et al. ............. 455/461 |

* cited by examiner

Primary Examiner—Danh C Le
(74) Attorney, Agent, or Firm—Blakely, Sokoloff, Taylor & Zafman LLP

(57) ABSTRACT

A convenient and efficient communication network within a building. Calls directed to a mobile device are routed to a communication interface device through a wireless communication network where the communication interface device is connected to the in-building communication network. The communication interface device provides data and analog facsimile in addition to voice services through the in-building communication network. A communication controller connected within the wireless communication network is configured to direct calls placed to a particular mobile device to a particular communication interface device based on triggering events.

11 Claims, 1 Drawing Sheet

COMMUNICATION NETWORK WITH REDIRECTION OF WIRELESS COMMUNICATION

The invention relates in general to wireless communication and more specifically to wireless communication within a building infrastructure. This application claims priority of provisional application Ser. No. 60/327,098 filed Oct. 3, 2001.

BACKGROUND OF THE INVENTION

Consumers can obtain communication services within a building infrastructure such as a residence or business location through twisted pair wiring, coaxial cable, wireless local loop (WLL), cellular and other wired and wireless systems. Many consumers use a wireless communication device such as cellular telephone when outside the home or office and use other communication devices within the home or office that are connected to an in-building communication network. For example, a consumer may use a telephone connected to a public switched telephone network (PSTN) at their home and a cellular telephone when traveling outside the home. As a result, many consumers are associated with more than two telephone numbers. In addition to the inconvenience of managing multiple telephone numbers, the consumer receives two bills for the separate services.

These problems are exacerbated in households or business having more than one consumer using a cellular telephone. One attempt at solving these problems includes only using the cellular telephone and discontinuing landline service such as twisted pair, cable or other wired service to the home or office. This scenario, however, has several limitations. For example, conventional cellular telephones are small and have limited battery life in order to maintain easily carried, light weight devices. The small devices are difficult to use and have limited performance due to the compact use interface. Although many consumers are willing sacrifice the ease of use and some quality when mobile, few are willing to make a sacrifice in the home or office. Further, disconnecting landline service typically results in the loss of data and facsimile services.

Therefore, there is need for system, apparatus and method for providing a convenient and efficient communication service within a building infrastructure and providing benefits of both cellular and landline services.

SUMMARY OF THE INVENTION

The present invention provides a convenient and efficient communication network within a building while providing benefits of both cellular and landline services. Calls directed to a mobile device are routed to a communication interface device through a wireless communication network where the communication interface device is connected to the in-building communication network. The communication interface device provides data and analog facsimile in addition to voice services through the in-building communication network. A communication controller connected within the wireless communication network is configured to direct calls placed to a particular mobile device to a particular communication interface device based on triggering events.

DETAILED DESCRIPTION OF THE PREFERRED EMBODIMENTS

Figure 1:
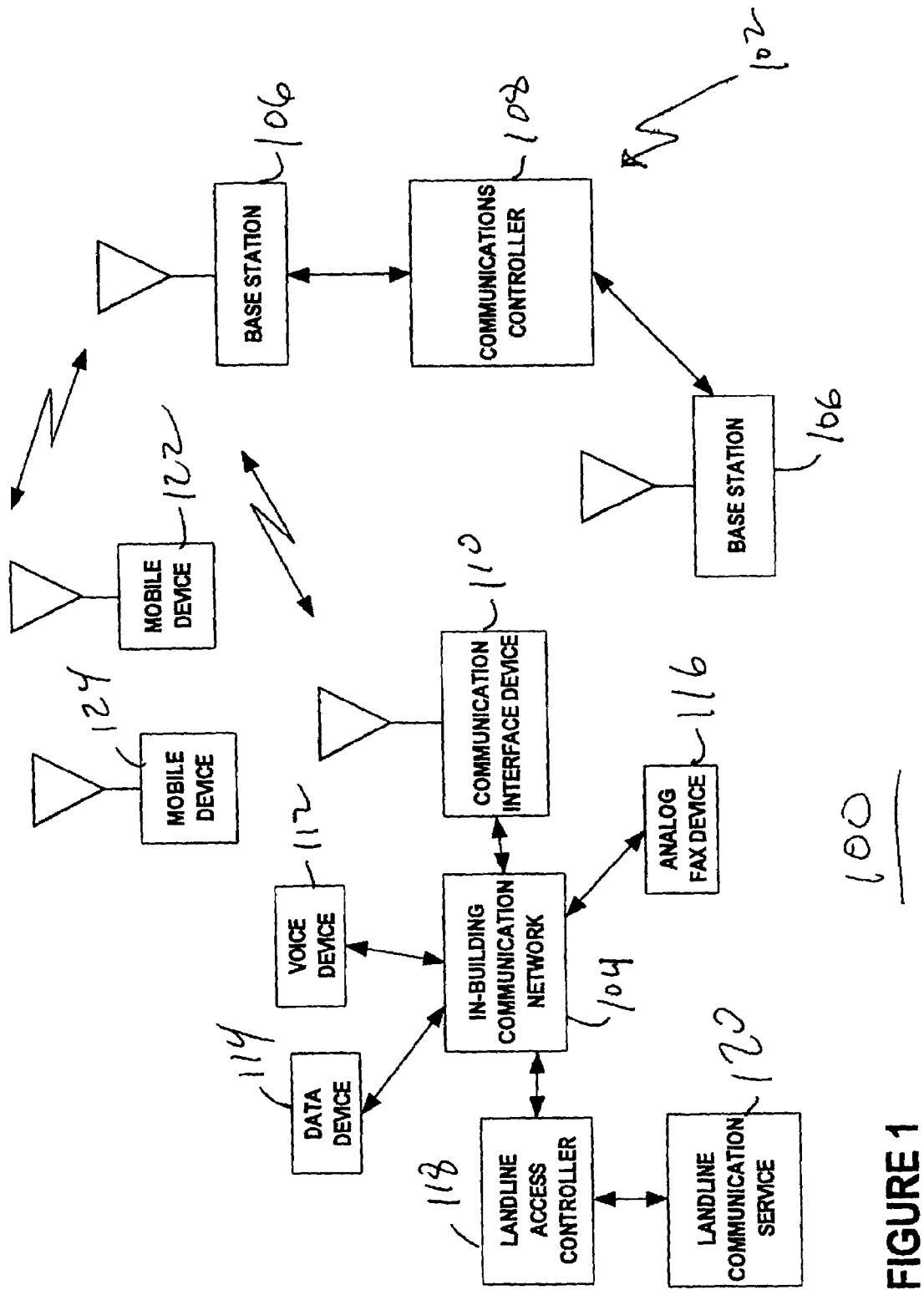
FIG. 1 is a block diagram of a communication system in accordance with an exemplary embodiment of the invention.

FIG. 1 is a block diagram of a communication system 100 in accordance with an exemplary embodiment of the invention. The communication system 100 includes at least one wireless communication network 102 and at least one in-building communication network 104 for providing communication service within a building such as a residence or business. The wireless communication network 102 includes one or more base stations 106 communicatively connected to a communication controller 108. The present invention may be implemented using any one of several wireless communication systems. Examples of suitable systems include CDMA cellular, TDMA cellular, GSM cellular and other cellular and PCS wireless systems using any number of wireless protocols and modulation techniques.

Depending on the particular wireless communication system 102, the communication controller 108 may be an OMC, MSC, BSC, any other type of controller, processor, combination of processors or any combination thereof. The communication controller 108 includes software code running on a computer or processor and adequate signaling and switching hardware for performing the functions described herein as well as facilitating the overall management and functionality of the wireless communication system 102.

A communication link is established between the wireless communication system 102 and a communication interface device 110 that is connected to the in-building communication network 104. The in-building communication network 104 may any type of wireless or wired network used within a building. In the exemplary embodiment, the in-building communication network 110 is a twisted pair telephone wire network including at least one section of twisted pair wire connecting the communication interface device 110 to an in-building communication device (112-116). The in-building communication network 104 may include several section of wire connecting multiple in-building communication devices 112-116 including voice devices 112 such as telephones and answering machines, data devices 114 such as computers and modems, and facsimile devices 116 such analog facsimile machines.

The communication interface device 110 and the wireless communication system 102 provide the communication services though the in-building communication network 104. Such systems providing voice service are often referred to as wireless local loop (WLL) systems. A WLL system providing data and facsimile services is described in U.S. patent application Ser. No. 09/315,371 entitled "Digital Wireless Local Loop Fax/Data Interface" filed on May 5, 1999.

The communication interface device 110 includes a wireless interface for communication with the wireless communication system and an in-building network interface for communication with in-building communication devices 112-116. The wireless interface includes appropriate hardware and software for communicating with the wireless communication system. In the exemplary embodiment, the wireless interface includes a transmitter and receiver managed by one or more processors having memory, an antenna and other radio frequency equipment in accordance with known techniques. The in-building network interface includes hardware and software for communicating with the in-building devices through the in-building network. In the exemplary embodiment, the in-building network interface includes an RJ11 connector for plugging into an existing RJ11 receptacle (telephone jack) in a residence or office building. The communication interface device 110 is associated with a unique identification such as telephone number. In the exemplary embodiment, the communication interface device 110 has a unique telephone number and a unique serial number.

In the exemplary embodiment, a landline access controller 118 provides a mechanism for connecting and disconnecting any existing landline service 120 such a PSTN service though twisted pair wiring or cable modem telephone system. The landline access controller 118 is connected between the landline service 120 provider and the in-building communication network 104. In the exemplary embodiment, the in-building communication network 104 is an arrangement of twisted pair wiring and the landline access controller 118 is connected to the incoming wiring at point before the wiring branches to any in-building communication devices (112-116).

The user accesses wireless communication services through a mobile device (122, 124). These one or more mobile devices (122, 124) are associated with a user that also utilizes the one or more of the in-building communication devices (112-116). In the exemplary embodiment, each of the mobile devices (122, 124) has unique identification serial and a unique telephone number. In the exemplary embodiment, the wireless communication system 102 provides wireless service to the mobile devices 122, 124 as well as providing WLL service to the in-building communication devices 112-116. Wireless service may be provided to the mobile devices 122-124 through another wireless system (not shown) that may or may not use the same type of protocols and modulation techniques as the wireless communication system 102 provides the WLL service. Further, each of the mobile devices 112-116 may use different types of modulation and protocols for communication. For example, a first mobile device 122 may be GSM cellular telephone, a second mobile device 124 may be a TDMA cellular telephone and the wireless communication system 102 providing WLL service may be a CDMA cellular system.

In accordance with the exemplary embodiment, calls placed to a telephone number of a mobile device 122 are directed to the communication interface device based on a triggering event. The communications controller 108 includes software code and is configured to direct the calls to interface device 110 when the conditions of a triggering event are met. The triggering events supported by the exemplary embodiment of the invention are discussed below. Implementations of the invention can include any combination or subset of the triggering events in the exemplary embodiment, in addition to other triggering events. Therefore, the invention is not be limited to the triggering events discussed herein or to the particular configuration or relationship between the triggering events.

Triggering Events

In the exemplary embodiment, the communication controller 108 can be configured to support the following triggering events which are discussed in further detail below: "general session terminated", "session terminated in home cell", "session terminated in home location", "general no coverage", "no coverage in home cell", "no coverage in home location", and "proximity message". Also in the exemplary embodiment, the user can submit control messages to provide a user preference for executing call directing. Although the triggering events are detected by the wireless communication system in the exemplary embodiment, some or all of the triggering events can be detected by other systems and conveyed to the communication controller 108 through signals or messages.

General Session Terminated

"General session terminated" triggering event occurs when the mobile device 122 is registered on any local or roaming network prior to the user turning off the mobile device 122. The user terminates the session by pushing a key on the mobile device 122 or otherwise entering information indicating that the power should be turned off or, at least, that the mobile device 122 should not remain actively registered to the wireless system. The mobile device 122 is at least registered to the system for this triggering event to occur. The "general session terminated" triggering event may occur during an active call or otherwise.

Session Terminated in Home Cell

The "session terminated in home cell" triggering event occurs when the mobile device 122 is registered on the same cell as the communication interface device 110 prior to user turning off the mobile device. In an implementation where wireless service to the communication interface device 110 is provided by a different cellular system than is providing the service to the mobile device 122, a correlation is made between the cells for each system such that the "session terminated in home cell" triggering event only occurs if the mobile device 122 is located within both of the cells.

Session Terminated in Home Location

The "session terminated in home location" triggering event occurs when, prior to the user turning off the mobile device 122, the mobile device 122 is registered within a defined area that includes the location of the communication interface device 110 and is smaller than the cell providing service to the communication interface device 110.

General No Coverage

The "general no coverage" triggering event occurs when communication is suddenly lost to a mobile device 122 or the mobile device 122 can not be located. This triggering event differs from the session terminated triggering events in that the mobile device 122 has not indicated to the system that the mobile device 122 will be no longer remain registered on the system.

No Coverage in Home Cell

The "no coverage in home cell" triggering event occurs when the mobile device 122 is registered within the cell used for providing service to the communication interface device 110 prior to the sudden loss of communication with mobile device 122.

No Coverage in Home Location

The "no coverage in home location" triggering event occurs when prior to the sudden loss of communication with the mobile device 122, the mobile device 122 is registered within a defined area that includes the location of the communication device 122 and is smaller than the cell providing service to the communication interface device 110.

Proximity Message

The "proximity message" triggering event occurs when a detection mechanism detects that the mobile device 122 is near the communication interface device 110 and the information is conveyed to the communication controller 108. A suitable example of a detection mechanism can be implemented using a wireless connection, (such as a Bluetooth connection) between the mobile device 122 and the communication interface device 110.

Control Messages

In preferred embodiments, the user may submit control messages to provide a user preference for executing call directing. The user may submit "always direct call", "never direct call", and "return to standard configuration" commands. When an "always direct call" command is received by the communication controller 108, all triggering events are overridden and every call that is placed to the mobile device 122 is directed to the communication interface device 110. When a "never direct call" command is received at the communications controller 108, all triggering events are overridden and the calls placed to the mobile device 122 are not directed to the communication interface device 110. Calls may be directed to default location such as voice mail or voice message indicating the called party has not turned on the mobile device 122 or is out of the calling area. When the "return to standard configuration" command is received by the communication controller 108, the configured trigger events are reestablished.

In preferred embodiments, the communication interface device 110 and the wireless communication system 102 may be configured to provide service in accordance with the particular requirements of users of the in-building communications devices 112-116. In a single person configuration allows a user to use the telephone number of the communication interface device 110 for facsimile or data service when calls placed to the mobile device are not directed to the communication interface device 110. In this configuration, no voice communication is required. Accordingly, the in-building communication network 104 can be used for data and fax.

Couple and Family Configurations

In a couple configuration, the in-building communication network 104 may be used for voice communication when the calls placed to the mobile device are not directed to the communication interface device 110. This configuration may be convenient where two or more persons use the in-building communication devices 112-116. For example, if two persons share a residence and one person is outside of the residence using the mobile device 122, the other person can still utilize the voice device 112 such as telephone for voice service. Further, the mobile device 122 can be used to communicate with the voice device 112 through the wireless communication system 102, communication interface device 110 and the in-building communication network 104.

In a family configuration, multiple mobile devices 122-124 are associated with a particular residence or business and the communication interface device 110. Each of the mobile devices 122 has a different telephone number and may have a different configuration for triggering events for directing a call placed to the particular mobile device.

Home Kit

A preferred embodiment of the present invention is in the form of a kit, which is the communication interface device shown as 110 in FIG. 1. Applicant calls this device a "home kit". The home kit is very similar to a wireless local loop (WLL) device known in the industry. One example of a WLL product is Telular Phonecell SX4e. The home kit may either be built based on a mobile handset kernel or based on a mobile modem kernel. One example of the mobile modem kernel is Wavecom Wismo. This kernel builds an interface to the mobile network, which is typically based on GSM or CDMA. Instead of connecting a modem to it, an analog circuit performs the interface between the RJ-11 (analog line(s)) and the wireless modem. It will generate a ring tone if the unit is being called and generate a dial tone if the user wants to make a call through the home kit.

One difference between a standard WLL device and the home kit is that the home kit is installed by subscribers and not by technicians as with the WLL devices. Therefore, special protection is needed on the analog interfaces to make sure that even if the analog line(s) are connected to a local office (e.g. Pacbell), no damage is done, since the local office and the home kit can generate ring tones with high voltage. In one embodiment, the home kit works with one mobile handset. If the mobile handset is on, all calls are forwarded to the mobile handset. If the mobile handset is "off", instead of forwarding it to the voicemail, the call is forwarded to the home kit.

Preferably the home kit has a CDMA-air interface (like a regular CDMA phone) and has an analog output (RJ-11). The home kit is plugged into an existing telephone plug at home (like a regular phone). This connects the home kit to any telephone connected to that existing telephone plug and provides outside communication for that telephone. If that telephone remains connected to a PSTN, the home kit will indicate an error display and not function. If the telephone is disconnected from the PSTN, the home kit will take over and provide wireless service for the telephone. These communication functions can be controlled via network 104. Once the home kit is called, all analog devices connected to the same analog line of the home kit ring and the user can pick up any regular phone (including cordless phones) and complete the call. It is important to note that no extra wiring is needed, since the analog cables are used as a bus system, so it does not matter where the home kit is plugged in. There is no physical connection between the home kit and mobile, in fact, the CDMA home kit would also work with GSM mobiles, if needed.

The home kit can process any analog device, like telephone, data, fax and credit card machines. The home kit could use separate analog lines (if needed) for voice and fax/data and could send SMS-messages to the mobile handset, if a call is received (e.g. "fax received at 12:38 from 858 676 2601"). The home kit can also originate calls from the analog phones into the CDMA network. In case a call is to be made via the home kit, a dial tone is generated so that the user of telephone 112 hears the dial tone when he picks up telephone 112. Preferably, the home kit contains a rechargeable battery so that communication through it is not lost when power is lost.

Caller Identification

Preferably, the home kit is programmed so that when a call is made from an analog telephone such as voice device 112, caller ID of the designated mobile phone is identified. If the home kit supports multiple handsets, a different number for each handset can be generated by using different analog lines for each set or by application of additional software to accommodate a prefix. In this case callers will be required to enter the prefix (like PBX).

Advantages of the Home Kit

Some of the advantage of the Home Kit as described above are as follows:

| | |
|---|---|
| one single bill | No need for a local wireline carrier and long distance provider |
| one single number | Users will use the mobile number only and as an option the Home Kit number as a fax number (no home number, mobile number). |
| better reception | since you can place the Home Kit close to the window and/or second floor, the reception is much better than a regular mobile phone. |
| convenient | you can use any analog phone (cordless phones, loudspeaker, answering machine . . . ). |
| voice quality | The Home Kit provides a voice quality, which is as least as good as the landline and much better than a mobile phone. |
| multiple lines | Home Kit can provide multiple analog lines, if needed, like: mobile A, fax mobile A, mobile B, fax |
| low radiation | Since the Home Kit is much further apart to the person who is talking, the radiation is much lower. |
| load of network | Usually the Home Kit is used in the evening and during the weekend. These are times, where the load of the network is low anyhow. |
| stationary use | The efficiency of these Home Kits are much higher than mobile handsets (no handover . . . ), so that the overall load can be higher. |
| multiple handsets | The Home Kit works with multiple handsets as well. |
| office use | It can also be used as a "Office Kit". A mobile could have a Home Kit and an Office Kit, if you combine the switch-off with the cell/location information. |

Home Kit Concept

In a preferred embodiment a kit is provided to subscribers. Each subscriber gets 2 units:
  The regular mobile phone (phone number A)
  The Home kit (phone number B for voice and C for fax/data or
    Just number B for all services). This Home Kit is very similar to a wireless local loop (WLL) product, which uses the mobile network.
  Regular wireline telephone(s) will be connected to the home kit unit through a RJ-11 connection. As an option, fax and a PC can be connected to the same (or different) line.

The system will be programmed in the following way: If number A is not reachable, the call will be forwarded to number B. So, instead of forwarding to a voice mail, the call is forwarded to the home unit.

As a consequence, the subscriber will publish number A only. When he comes home (or office) he switches off the mobile phone and the "regular" phone is active (through call forwarding).

If the subscriber is using the Home Kit for an outgoing call (number B), the system could be configured, that the receiving party with caller id will see number A (instead of number B).

Home Kit Single Person Configuration

The Home Kits can be provided as a single person configuration. This configuration is used, when you have one single person, using a mobile phone and the Home Kit. Number B could be used as a fax number, since the Home unit will be called directly. As an option, an SMS (short message service) can be sent in this case to number A (like: "fax received from 858 333 9999 at 08:45").

The call forwarding of number A to number B can be triggered by the following options:
  number A handset switched off,
  number A handset no coverage/not available,
  number A handset busy
  number A handset rejected the incoming call In these cases an SMS could be sent to number A (like: "call received from 858 333 9999 at 08:45"). If the subscriber connects an answering machine to the Home Kit, the subscriber can call number B directly (voicemail number) and retrieve the messages. If fax and voice are using the same number (number B only), the fax machine will "listen" to the call and accept the incoming fax.

Couple Configuration

This embodiment is similar to "single" configuration, but another person may use the Home Kit. In this case, the home unit will also be used to make outgoing calls when the handset is active. So, subscriber A (number A) may call number B (at home or office) and vice versa.

Family Configuration

In this case, there are at least 2 mobile handsets and a Home Kit. In this case the list for mobiles are programmable (1 to n mobiles in the list for notifying fax and voice mails).

Activation of Home Kit

The Home Kit is activated as follows:
When mobile number is called and the Home Kit should ring. There are several different possibilities:
  Switch off mobile
  Switch off mobile and "home cell"
    The mobile must be close to home (within the same cell as the home kit)
    Note, that this could work with different Home Kits, e.g one Home Kit at home and the other one in the office.
  Switch off mobile and "home location"
    The mobile must be close to home. The E-911 feature allows location for mobiles.
    This information can be used.
    Note, that this could work with different Home Kits, e.g., one Home Kit at home and the other one in the office.
  No coverage
  No coverage and "home cell"
  No coverage and "home location"
  Send a special message from a telephone (mobile or fixed) to the system
    This means, a special number is dialed with a special coding.
    The coding could be:
      Forward call from mobile regardless
      Disable Home Kit (if you are traveling)
      Forward calls based on the modes mentioned above
  This procedure most likely would use a password to protect privacy. It is similar as retrieving voicemails.

Configuration with Wires to Wire Line Carrier

This configuration is easy for houses/apartments without the local carrier (like PacBell). The other possibility is, to allow the link to the local carriers:

Incoming calls will be processed as discussed previously.
Outgoing calls will be configurable:
    Outgoing calls for local carrier (Home Kit passive for outgoing calls)
    Outgoing calls for Home Kit (Home Kit is active for outgoing calls) In order to do it, a Hardware device needs to be installed at the "PacBell-connection" to prevent dialing information going out to the local carrier. In this case, only wireline incoming calls are processed.

Other Options

Other options and features may be provided to the users and as will be recognized by those skilled in the art based on the teachings herein. In some implementations for example, the communication interface station can be configured to transmit a short message service (SMS) message when data or a fax is received. Further, a particular mobile device may be associated with multiple communication interface devices 110. For example, a particular mobile device may be associated with a communication interface device 110 within the user's residence and with another communication interface device 110 located at the user's place of business.

Clearly, other embodiments and modifications of this invention will occur readily to those of ordinary skill in the art in view of these teachings. For example, although the homekit describe above is intended primarily for the home market, obviously it can be used effectively in small office applications. Therefore, this invention is to be limited only by following claims, which include all such embodiments and modifications when viewed in conjunction with the above specification and accompanying drawings.

What is claimed is:

1. A communication system comprising:
A) a communication interface device connected to an in-building communication network, the network connected to at least one in-building communication device, wherein the communication interface corresponds to a unique telephone number to communicate using a wired, public switch telephone network (PSTN);
B) a wireless communication network connected to the communication interface device and configured to bypass a plurality of mobile devices by selectively directing calls originally placed to the mobile devices to the communication interface device in response to a plurality of conditions corresponding to triggering events, wherein a first mobile device has a first set of triggering events and a second mobile device has a second set of triggering events, wherein the first mobile device and the second mobile device communicate using a cellular communications network when not within range of the in-building communications device;
C) a landline access controller couple with the in-building communication device to provide landline telephone service through the communication interface device.

2. A communication system as in claim 1 and further comprising a communication controller and at least one base station for providing wireless communication to mobile devices including said mobile device and said communication interface device.

3. A communication system as in claim 2 wherein said at least one in-building communication device comprises a plurality of in-building communication devices.

4. A communication system as in claim 3 wherein said plurality of communication devices includes at least one voice device, at least one data device and at least one analog FAX device.

5. A communication system as in claim 4 wherein said in-building communication network is connected to a landline access controller and a landline communication service.

6. A communication system as in claim 2 wherein said communication interface station is marketed as a part of a home kit.

7. A communication system as in claim 6 wherein said home kit is configured for use by a single person.

8. A communication system as in claim 6 wherein said home kit is configured for use by two people.

9. A communication system as in claim 6 wherein said home kit is configured for use by a family.

10. A communication system as in claim 6 wherein said home kit is configured for communication standard chosen from the following standards: CDMA, GSM, and TDMA.

11. A communication system as in claim 6 wherein said home kit is configured for use a plurality of communication lines.

* * * * *